(12) United States Patent
Kim et al.

(10) Patent No.: US 8,107,039 B2
(45) Date of Patent: Jan. 31, 2012

(54) THIN FILM TRANSISTOR SUBSTRATE AND A FABRICATING METHOD THEREOF

(75) Inventors: Jang-Sub Kim, Suwon-si (KR);
Dong-Gyu Kim, Yongin-si (KR);
Yoon-Ho Kang, Yongin-si (KR);
Kwang-Ho Lee, Seoul (KR);
Chang-Hun Kwak, Suwon-si (KR);
Jae-Jun Yu, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 315 days.

(21) Appl. No.: 12/494,755

(22) Filed: Jun. 30, 2009

(65) Prior Publication Data

US 2010/0123860 A1    May 20, 2010

(30) Foreign Application Priority Data

Nov. 18, 2008   (KR) .......................... 10-2008-0114779

(51) Int. Cl.
*G02F 1/1335*   (2006.01)

(52) U.S. Cl. ........................................................ 349/106
(58) Field of Classification Search ........... 349/106–107
See application file for complete search history.

(56) References Cited

U.S. PATENT DOCUMENTS

| 6,022,647 | A  | * | 2/2000  | Hirose et al. | ...................... 430/7 |
| 6,806,925 | B2 | * | 10/2004 | Ishii et al.  | ..................... 349/106 |
| 7,884,900 | B2 | * | 2/2011  | Doi et al.    | ..................... 349/110 |

FOREIGN PATENT DOCUMENTS

| KR | 1020020071542 | 9/2002 |
| KR | 1020070001658 | 1/2007 |
| KR | 1020070037114 | 4/2007 |

* cited by examiner

*Primary Examiner* — James Dudek
(74) *Attorney, Agent, or Firm* — F. Chau & Associates, LLC

(57) ABSTRACT

A display device including an insulating substrate, a signal line located on the insulating substrate, a dam and a first color filter pattern located on the insulating substrate, and a second color filter pattern located in a pixel region which has a border defined by the dam, wherein the dam and the first color filter pattern are part of the same layer.

16 Claims, 8 Drawing Sheets

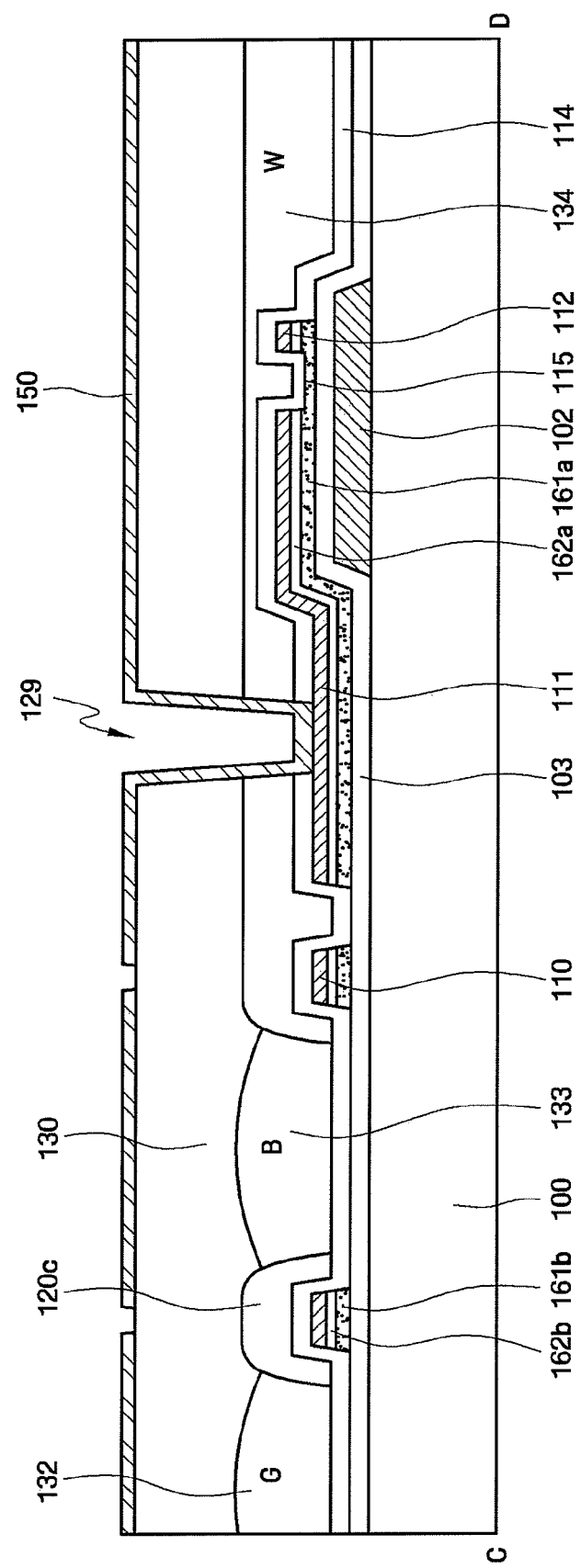

THIN FILM TRANSISTOR SUBSTRATE AND A FABRICATING METHOD THEREOF

CROSS-REFERENCE TO RELATED APPLICATION

This application claims priority to Korean Patent Application No. 10-2008-0114779 filed on Nov. 18, 2008 in the Korean Intellectual Property Office, the disclosure of which is incorporated by reference herein in its entirety.

BACKGROUND OF THE INVENTION

1. Technical Field

The present invention relates to a thin film transistor substrate and a method of fabricating the same, and more particularly, to a display device including a thin film transistor substrate having a white pixel and a method of forming the same.

2. Discussion of the Related Art

Liquid crystal display (LCD) devices include a first substrate having a thin film transistor (TFT) thereon, a second substrate opposite the first substrate and having a color filter thereon and a liquid crystal layer interposed between the first substrate and the second substrate. The liquid crystal layer may have anisotropic dielectric properties. The LCD devices can display images by adjusting the amount of light transmitted through the liquid crystal layer by controlling an electrical signal applied to a common electrode and a pixel electrode formed on the first substrate and/or the second substrate.

Generally, the first substrate has a number of thin film transistors and the second substrate has a number of color filter patterns which may include a red color filter pattern, a green color filter pattern and a blue color filter pattern. To fabricate the LCD device, the first substrate and the second substrate are assembled, but during the assembly, the color filter pattern on the second substrate and the TFT on the first substrate can be misaligned. To reduce the misalignment, an assembly margin may be increased, but this can diminish a transmittance of the LCD devices. Conversely, the reduction of the assembly margin can increase the transmittance of the LCD devices. Fabricating the TFT and the color filter pattern on the same substrate in a color filter pattern on array (COA) structure can reduce the assembly margin and increase the transmittance of the LCD devices. In addition, forming a light blocking pattern on the first substrate can increase the transmittance of the LCD devices.

However, several photo mask steps are used to make the color filter patterns on the second substrate. Costs and turnaround times to fabricate the LCD devices may be in proportion with the number of steps of a photo lithography process. As a result, reducing the number of photo mask steps to fabricate the color filter patterns can reduce the costs and the turnaround times.

An inkjet printing method can reduce the number of photo mask steps for making the color filter patterns. For example, because the color filter patterns can be directly formed on a substrate by the inkjet printing method without having to use the photo lithography process, the costs and the turnaround times can be reduced.

To make high resolution displays, pixel sizes of the LCD devices have been reduced. However, because the transmittance of the LCD devices depends on the open ratio of the pixels and the transmittance of the color filter pattern, the reduction of the pixel sizes decreases the transmittance of the LCD devices. Moreover, the color filter patterns having a red color filter pattern, a green color filter pattern and a blue color filter pattern may only transmit 33% of incident light. To increase the transmittance of the high resolution displays, a white color filter pattern which transmits almost all of the incident light may be realized. However, the formation of the white color filter pattern adds another process step, and thus can increase the costs and turnaround times for the fabrication of LCD devices.

Accordingly, there is a need to increase the transmittance of an LCD device while reducing the costs and turnaround times for its fabrication.

BRIEF SUMMARY OF THE INVENTION

According to an exemplary embodiment of the present invention, a display device is provided. The display device includes an insulating substrate, a signal line located on the insulating substrate, a dam and a first color filter pattern located on the insulating substrate, and a second color filter pattern located in a pixel region which has a border defined by the dam, wherein the dam and the first color filter pattern are part of the same layer. The second color filter pattern may include a red, a green, or a blue color filter pattern. The second color filter pattern may also include a magenta, a cyan, or a yellow color filter pattern. The first color filter pattern may have a white color filter pattern.

The display device further includes a pixel electrode formed on the first color filter pattern, a smoothing layer located on the first color filter pattern, and a light blocking pattern located on at least one of the first color filter pattern, the dam or the second color filter pattern. The signal line has a gate line or a data line. The dam is located on the signal line and below the light blocking pattern. The dam further includes a white pigment and the thickness of the dam is more than about 2 um and less than about 10 um. The pixel electrode covers a portion of the signal line.

According to an exemplary embodiment of the present invention a method of fabricating a display device is provided. The method includes forming a signal line on an insulating substrate, forming a dam and a first color filter pattern on the insulating substrate, and forming a second color filter pattern on the insulating substrate using an inkjet printing method, wherein the dam and the first color filter pattern are formed during the same process step. The second color filter pattern has a red, a green, or a blue color filter pattern. The second color filter pattern has a magenta, a cyan, or a yellow color filter pattern. The first color filter pattern includes a white color filter pattern. The dam includes the same material as the first color filter pattern.

The method further includes forming a pixel electrode on at least one of the first or second color filter patterns, forming a smoothing layer between the pixel electrode and at least one of the dam, the first color filter pattern or the second color filter pattern. The light blocking pattern is formed on at least one of the dam, the first color filter pattern or the second color filter pattern. The signal line has a gate line or a data line. The dam is formed on the signal line and below the light blocking pattern. The dam further includes a white pigment. The thickness of the dam is more than about 2 um. A portion of the pixel electrode overlaps the signal line.

According to an exemplary embodiment of the present invention, a thin film transistor substrate is provided. The thin film transistor substrate includes an insulating substrate, a signal line located on the insulating substrate, a dam and a first color filter pattern located on the insulating substrate, a second color filter pattern located on the insulating substrate, a smoothing layer located on the dam, the first color filter pattern and the second color filter pattern, a pixel electrode located on the smoothing layer and a light blocking pattern located on the signal line, wherein the dam and the first color filter pattern are located on the same layer.

BRIEF DESCRIPTION OF THE DRAWINGS

The above and other features of the present invention will become more apparent by describing in detail exemplary embodiments thereof with reference to the accompanying drawings in which:

FIG. 1c is a cross-sectional view of the thin film transistor substrate taken along line A-B in FIG. 1a.

FIG. 1d is a cross-sectional view of the thin film transistor substrate taken along line C-D in FIG. 1b.

DETAILED DESCRIPTION OF EXEMPLARY EMBODIMENTS

Figure 1A:
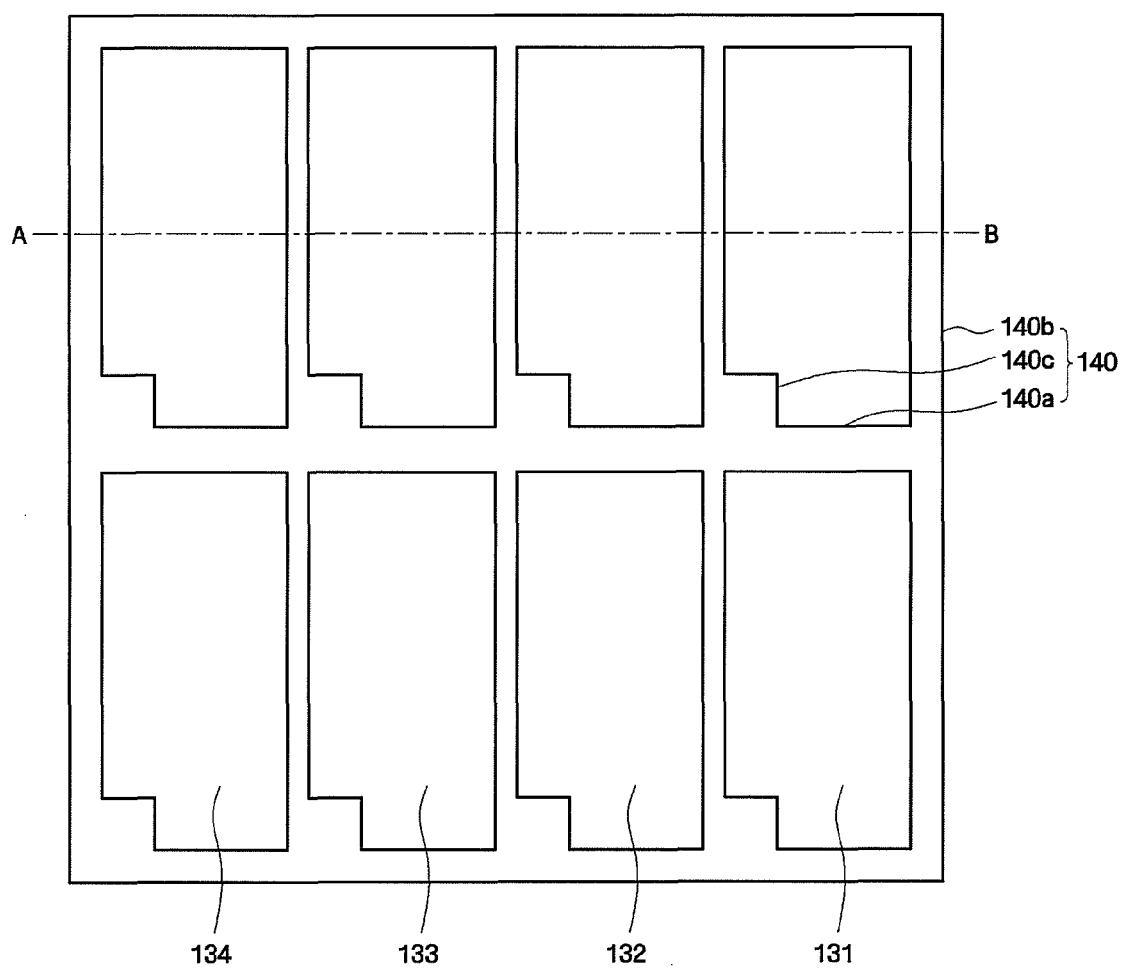
FIG. 1a is a plan view of a thin film transistor substrate obtained using a method of fabricating a thin film transistor substrate according to an exemplary embodiment of the present invention.

The invention will now be described more fully hereinafter with reference to the accompanying drawings, in which exemplary embodiments of the present invention are illustrated. The invention may, however, be embodied in many different forms and should not be construed as limited to the embodiments set forth herein.

In the figures, the dimensions of layers and regions may be exaggerated for clarity. It will be understood that when a layer or element is referred to as being "on" another layer or element, it can be directly on the other layer or element, or intervening layers may also be present. Further, it will be understood that when a layer is referred to as being "under" another layer or element, it can be directly under the layer or element, or one or more intervening layers or elements may also be present. In addition, it will be understood that when a layer or an element is referred to as being "between" two layers or elements, it can be the only layer between the two layers or elements, or one or more intervening layers or elements may also be present. Like reference numerals refer to like elements throughout.

It will be understood that the order in which the steps of each fabrication method according to an exemplary embodiment of the present invention disclosed in this disclosure are performed is not restricted to those set forth herein, unless specifically mentioned otherwise. Accordingly, the order in which the steps of each fabrication method according to an exemplary embodiment of the present invention disclosed in this disclosure are performed can be varied.

FIG. 1a is a plan view of a thin film transistor substrate obtained using a method of fabricating a thin film transistor substrate according to an exemplary embodiment of the present invention.

Referring to FIG. 1a, pixel areas are defined by light blocking patterns 140 (140a, 140b, and 140c) according to an exemplary embodiment of the present invention. The light blocking patterns 140 include a metal and metal oxide double layer such as a Cr/CrOx double layer or a polymer resin, such as acrylic resin including a carbon black powder. The diameter of the carbon black powder is less than about 1 um. A red color filter pattern 131, a green color filter pattern 132, a blue color filter pattern 133 and a white color filter pattern 134 may be positioned between the light blocking patterns 140. Due to the high transmittance of the white color filter 134, liquid crystal display (LCD) devices having the red color filter pattern 131, green color filter pattern 132, blue color filter pattern 133 and the white color filter 134 can display brighter images than LCD devices having only the red color filter pattern 131, green color filter pattern 132 and blue color filter pattern 133.

Figure 1B:
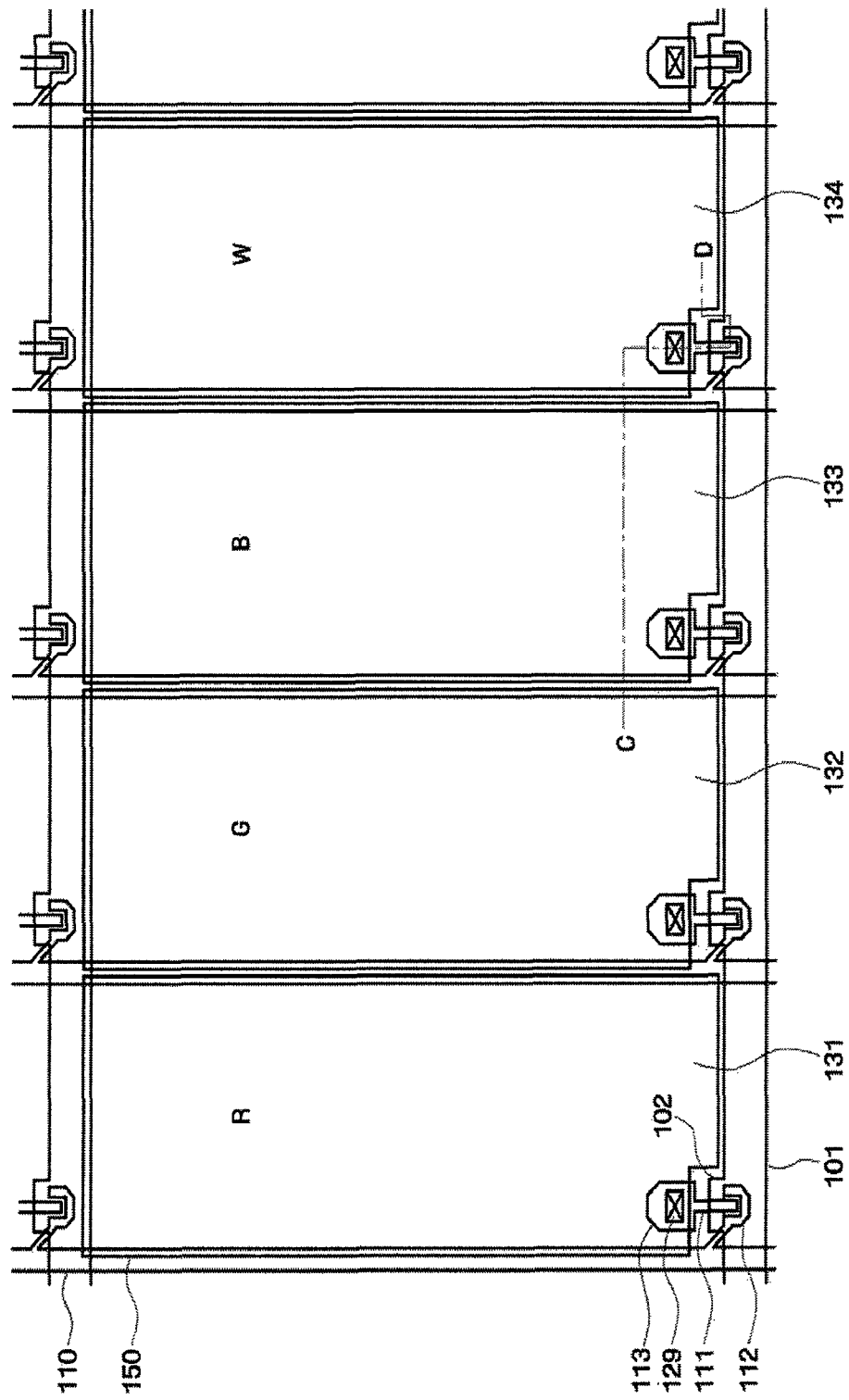
FIG. 1b is a plan view of the thin film transistor substrate in FIG. 1a after removing light blocking patterns.
Figure 1C:
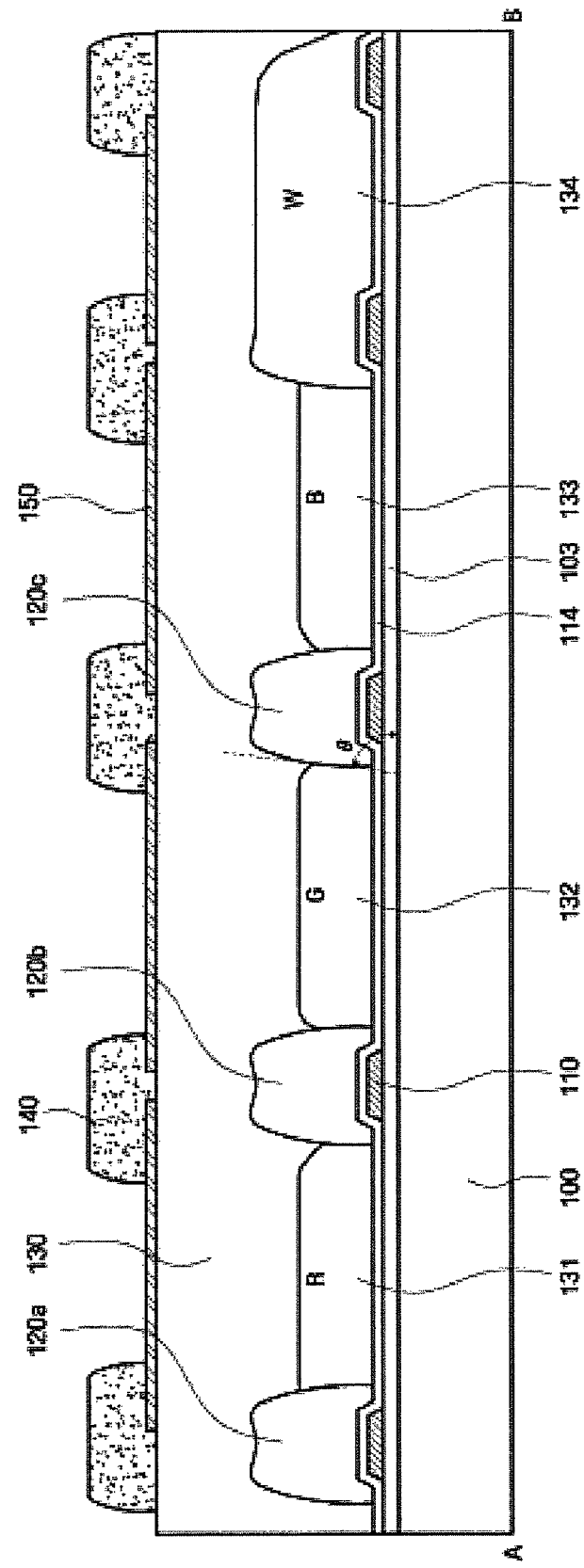

FIG. 1b is a plan view of the thin film transistor substrate in FIG. 1a after removing the light blocking patterns 140. FIG. 1c is a cross-sectional view of the thin film transistor substrate taken along line A-B in FIG. 1a. FIG. 1d is a cross-sectional view of the thin film transistor substrate taken along line C-D in FIG. 1b.

Referring to FIG. 1b, FIG. 1c and FIG. 1d, a gate line 101 is formed on an insulating substrate 100. A gate electrode 102 protrudes from the gate line 101. The gate line 101 is disposed in a first direction. A gate signal is communicated from a gate driver IC (not shown) through the gate line 101 to the gate electrode 102. A gate insulating layer 103 is formed adjacent to the gate electrode 101. In the present exemplary embodiment, a bottom gate type thin film transistor substrate is described. Semiconductor patterns 161 (161a, and 161b) made of a non single crystal semiconductor layer are formed on the gate insulating layer 103. The semiconductor pattern 161 on the gate electrode 102 may act as a channel region 115 to transmit a carrier of the thin film transistor such as an electron or a hole. Ohmic contact layers 162 (162a, and 162b) are formed on the semiconductor layer patterns 161 and the ohmic contact layers 162 are made of a silicide layer or n-type impurities doped on a hydrogenated amorphous silicon thin film.

A data line 110 may be formed on the ohmic contact layer 162 and/or the gate insulating layer 103. The data line 110 includes a source electrode 112 which may be rounded like a U. The source electrode 112 may be disposed against a drain electrode 111 on the gate electrode 102. One end of the drain electrode 111 is surrounded by the source electrode 112, and the other end of the drain electrode 111 includes a contact pad 113 which may be in contact with a different layer. But the drain electrode 111 and the source electrode 112 may have different or the same planar shapes. A data signal is communicated through data line 110 from a data driving IC (not shown), to the drain electrode 112. Data line 110 is disposed in a second direction which is different from the first direction. A pixel region is defined by the data line 110 and the gate line 101. The gate line 101 and the data line 110 may be a signal line in the present exemplary embodiment. The gate line 101 and the data line 110 may be a single layer or a multi layer structure comprising at least one of Al, Cu, Mo, Nd, Ti, Pt, Ag, Nb, Cr, W or Ta.

The ohmic contact layer 162, the data line 110 and the drain electrode 111 may have substantially the same planar shape. The semiconductor layer pattern 161 can also have substantially the same planar shape as the ohmic contact layer 162, the data line 110 and the drain electrode 111 except for channel region 115 between the drain electrode 111 and the source electrode 112. A passivation layer 114 may be formed on the data line 110, the drain electrode 111 and the channel region 115. The gate insulating layer 103 and the passivation layer 114 may include at least one of SiOx, SiNx or SiONx, and carbon (C) may be included in the SiOx, SiNx or SiONx layer.

Thereafter, a dam 120 may be formed on the insulating substrate 100. The dam 120 may be formed along the signal line, such as the data line 110 or the gate line 101. A white color filter pattern 134 may act as both the dam 120 and the white color filter pattern 134. The thickness of the dam 120 may be between about 2 μm and about 10 μm, and a side slope of the dam 120 may be tapered according to a surface of the insulating substrate 100. The tapered angle θ of the dam 120c in FIG. 1c may be between about 50° and about 120°. The dam 120 may include organic material which has at least one of a surfactant having a silicon or fluorine atom, and a dielectric constant of the dam 120 may be lower than about 4. The white color filter pattern 134 further includes a white pigment to match the red color, the green color and the blue color.

The color filter patterns 131, 132 and 133 are positioned in openings which are defined by the dams 120a, 120b, and 120c and/or the white color filter pattern 134. For example, the color filter pattern 132 is positioned between the dams 120b and 120c, and the color filter pattern 133 is positioned between the dam 120c and the white color filter pattern 134. Because the dam 120 is thick and the tapered angle θ of the dam 120 is high, the color filter patterns 131, 132 and 133 can be formed by an inkjet printing method without intermixing between the different color filter patterns.

In an exemplary embodiment of the present invention, the white color filter pattern 134 may be simultaneously formed with the dams 120, so that the number of process steps for the fabrication of the four color filter patterns 131, 132, 133 and 134 can be reduced and the transmittance of a display device having the color filter patterns 131, 132, 133 and 134 can be increased due to the high transmittance of the white color filter pattern 134. Thus, a high definition display device having high transmittance can be easily fabricated at low cost using an exemplary embodiment of the present invention.

Thereafter, a smoothing layer 130 may be formed on the dams 120 and the color filter patterns 131, 132, 133, and 134. However, the dam 120 and the white color filter pattern 134 may not be covered by the smoothing layer 130. The smoothing layer 130 can be made of an organic resin which can be patterned by a photo lithography process. The smoothing layer 130 can prevent a contaminant, which causes image sticking, from flowing out from the color filter patterns 131, 132, and 133 to a liquid crystal layer (not shown). In addition, the smoothing layer 130 can flatten the surface of the color filter patterns 131, 132, 133, and 134 and the dam 120, so that the behavior of the liquid crystal layer (not shown) can be easily controlled by an applied signal. The dam 120 and the white color filter pattern 134 may be flattened without the smoothing layer 130 by increasing the thickness of the red color filter pattern 131, the green color filter pattern 132 and the blue color filter pattern 133.

A pixel electrode 150 may be formed on the smoothing layer 130. The pixel electrode 150 may be made of an indium tin oxide or an indium zinc oxide. A light blocking pattern 140 may be formed along the gate line 101 and/or the data line 110, and the light blocking pattern 140 may be formed on the dams 120. A capping layer (not shown), which is made of an inorganic layer, such as SiNx, SiOx or SiONx, may be formed on the light blocking pattern 140 to prevent the contamination of the liquid crystal layer (not shown). The light blocking pattern 140 may be formed on an opposite substrate (not shown) which faces the insulating substrate 100 where the thin film transistor is formed, and the liquid crystal layer (not shown) may be positioned between the insulating substrate 100 and the opposite substrate (not shown).

A dam, a first color filter or second color filter may be formed on a second substrate opposite the first substrate. And a common electrode (not shown) is formed on the first color filter pattern or second color filter pattern.

FIG. 2, FIG. 3, FIG. 4, and FIG. 5 are cross-sectional views for explaining the steps of a method of fabricating a thin film transistor substrate according to an exemplary embodiment of the present invention.

Figure 2:
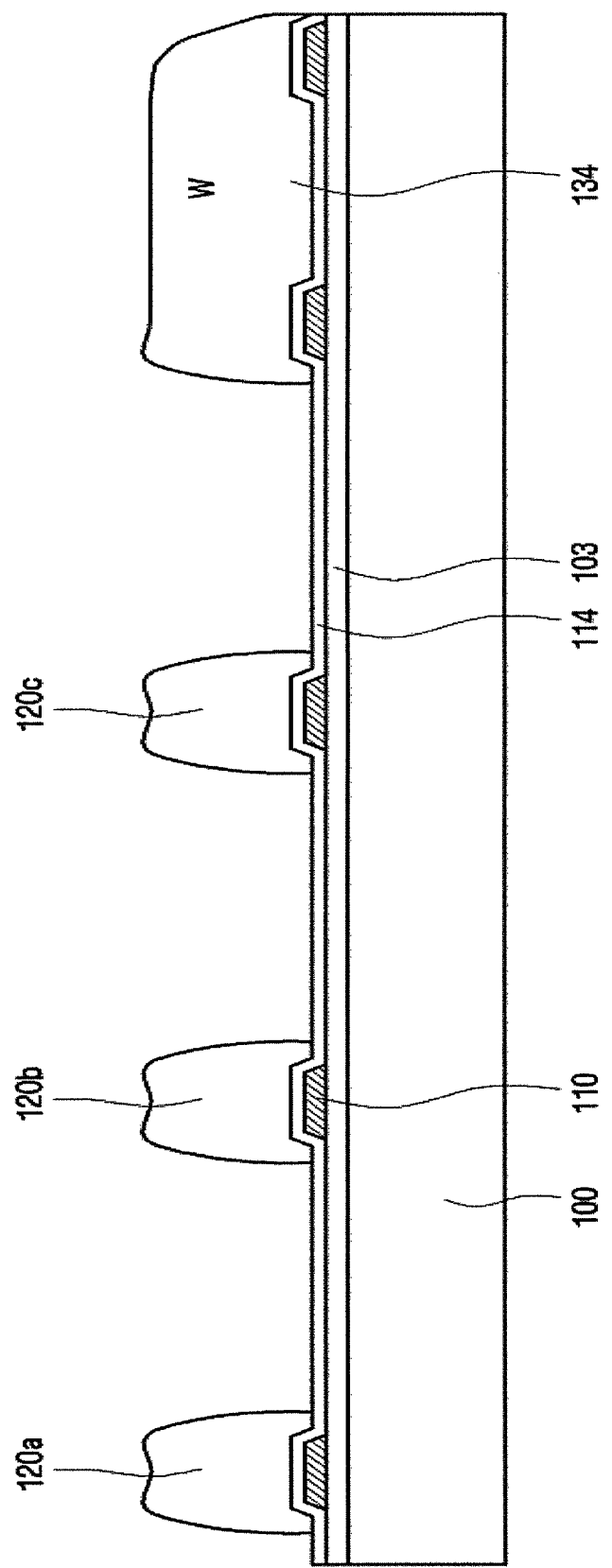
FIG. 2, FIG. 3, FIG. 4, and FIG. 5 are cross-sectional views for explaining the steps of a method for fabricating a thin film transistor substrate according to an exemplary embodiment of the present invention.

Referring to FIG. 2, a data line layer (not shown) is deposited on an insulating substrate 100, and the data line 110 is formed by the photo lithography process and an etching method. A photoresist layer (not shown) may be formed on the data line layer (not shown). The photoresist layer may be selectively exposed using an optical mask (not shown). The photoresist layer, which has photochemical properties that are changed by the exposure, is developed, thereby obtaining a photoresist layer pattern (not shown) having a desired shape. Thereafter, the data line 110 may be formed by etching the data line layer (not shown) using the photoresist layer pattern as an etching mask. After the formation of the data line 110, the passivation layer 114 is formed on the data line 110. After the formation of the passivation layer 114, an organic or inorganic layer (not shown) having high optical transmittance properties may be formed on the insulating substrate 100. After that, the dams 120a, 120b, and 120c and a white color filter pattern 134 may be formed by the photo lithography and etching method as previously described. If the organic or inorganic layer (not shown) can be patterned by only the photo lithography process, the dams 120a, 120b, and 120c and the white color filter pattern 134 are formed by only the photo lithography process without the etching process.

Figure 3:
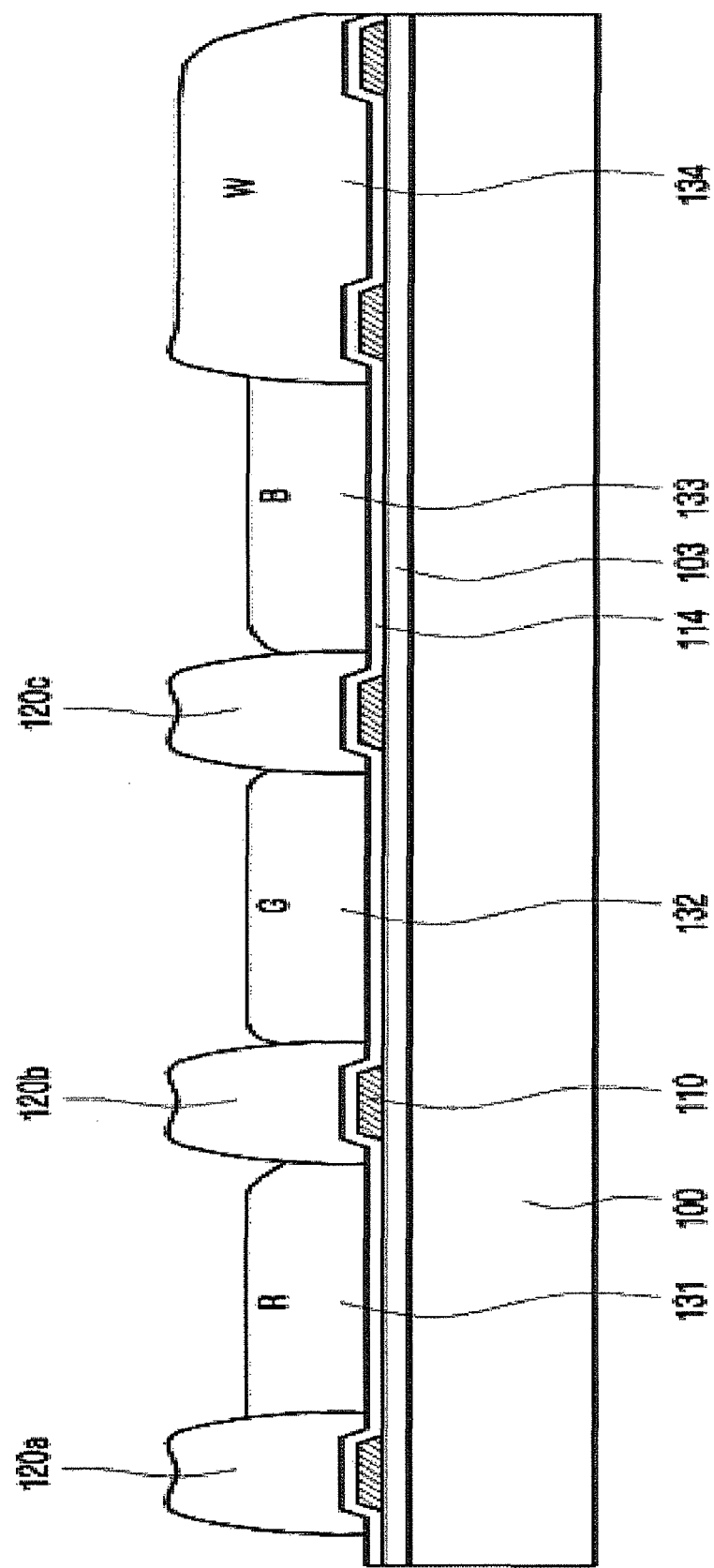

FIG. 3 is a cross-sectional view for explaining a method of fabricating a color filter pattern according to an exemplary embodiment of the present invention.

Referring to FIG. 3, the color filter patterns 131, 132, and 133 are formed using an inkjet printing method. The thickness of the dam 120 is enough to form the color filter patterns 131, 132, and 133 using an inkjet printing method, and because the side of the dam 120 is tapered, the color filter patterns 131, 132, and 133 can easily fill an area defined by the dams 120.

Figure 4:
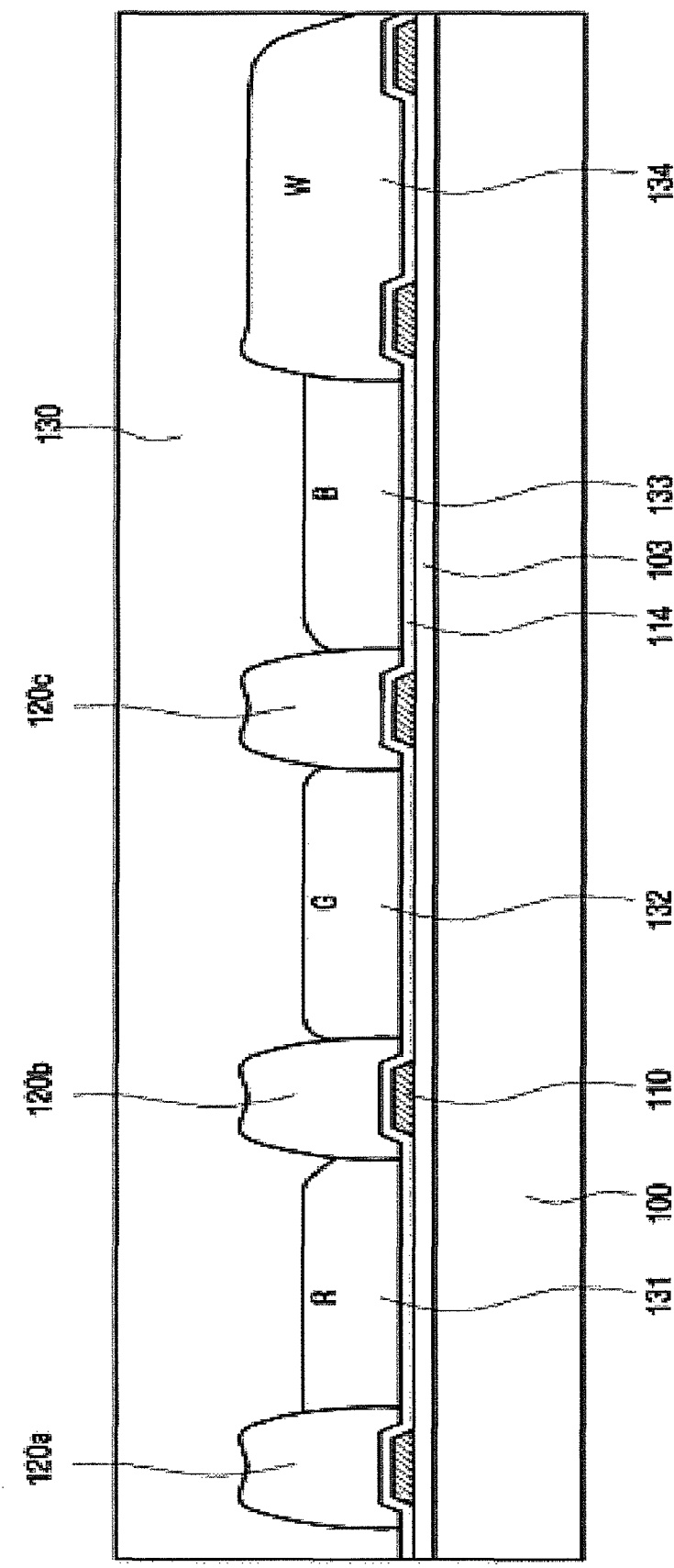

FIG. 4 is a cross-sectional view for explaining a method of fabricating a smoothing layer according to an exemplary embodiment of the present invention.

Referring to FIG. 4, the smoothing layer 130 is formed on the insulating substrate 100. The smoothing layer 130 may have a contact hole 129 (see FIG. 1b) which exposes the surface of the data line 110. The smoothing layer 130 may be patterned by the photo lithography process. If the smoothing layer 130 may not be patterned by the photo lithography process, since it is an inorganic layer including, for example SiOx, or SiNx, the smoothing layer 130 having the contact hole 129 may be formed using a photo lithography and etching process. If the smoothing layer 130 may be patterned by the photo lithography process, since it is an organic resin, the smoothing layer 130 having the contact hole 129 may be formed by only the photo lithography process.

Figure 5:
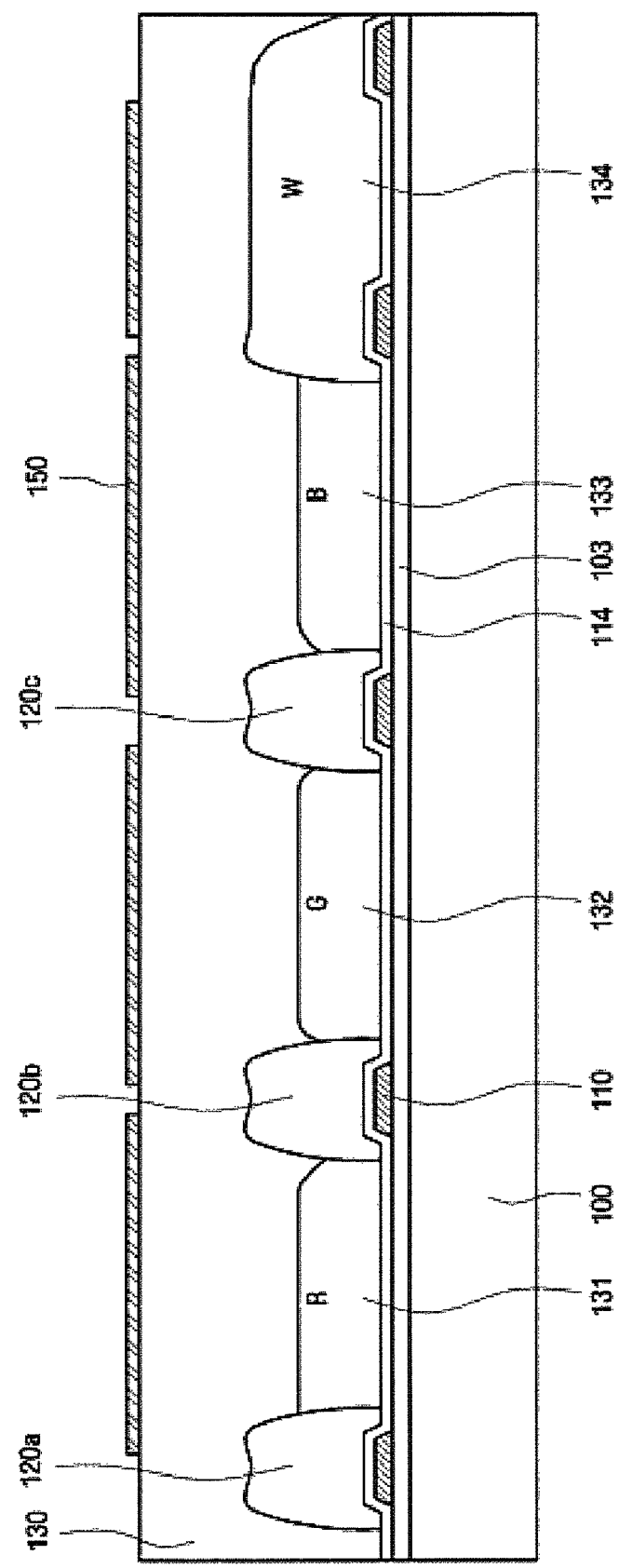

FIG. 5 is a cross-sectional view for explaining a method of fabricating a pixel electrode according to an exemplary embodiment of the present invention.

Referring to FIG. 5, the pixel electrode layer (not shown) is deposited on the insulating substrate 100 by a sputtering method or a chemical vapor deposition method. The pixel electrode 150 is formed by the photo lithography process and the etching process. A photoresist layer (not shown) may be formed on the pixel electrode layer (not shown). The photoresist layer may be selectively exposed using an optical mask (not shown). The photoresist layer, which has photochemical properties that are changed by the exposure, is developed, thereby obtaining a photoresist layer pattern (not shown) having a desired shape. Thereafter, the pixel electrode 150 may be formed by etching the pixel electrode layer using the photoresist layer pattern as an etching mask.

A dam, a first color filter or second color filter may be formed on a second substrate opposite the first substrate. And a common electrode (not shown) is formed on the first color filter pattern or second color filter pattern.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:
    an insulating substrate;
    a dam and a first color filter pattern located on the insulating substrate; and
    a second color filter pattern located in a pixel region which has a border defined by the dam,
    wherein the dam and the first color filter pattern are part of the same layer,
    wherein the second color filter pattern comprises a red, a green or a blue color filter pattern, and
    wherein the first color filter pattern comprises a white color filter pattern.

2. The display device of claim 1, wherein the second color filter pattern comprises a magenta, a cyan or a yellow color filter pattern.

3. The display device of claim 1, wherein a pixel electrode is formed on the first color filter pattern.

4. The display device of claim 3, wherein a smoothing layer is located on the first color filter pattern.

5. The display device of claim 1, wherein a common electrode is formed on the first color filter pattern.

6. The display device of claim 4, wherein the dam is located on a signal line and below a light blocking pattern.

7. The display device of claim 6, wherein the dam further comprises a white pigment.

8. A method of manufacturing a display device, the method comprising:
    forming a dam and a first color filter pattern on the insulating substrate; and
    forming a second color filter pattern on the insulating substrate using an inkjet printing method,
    wherein the dam and the first color filter pattern are formed during the same process step,
    wherein the second color filter pattern comprises a red, a green, or a blue color filter pattern, and
    wherein the first color filter pattern comprises a white color filter pattern.

9. The method of claim 8, wherein the second color filter pattern comprises a magenta, a cyan, or a yellow color filter pattern.

10. The method of claim 8, wherein the dam comprises the same material as the first color filter pattern.

11. The method of claim 10, further comprising:
    forming a pixel electrode on at least one of the first or second color filter patterns.

12. The method of claim 11, further comprising;
    forming a smoothing layer between the pixel electrode and at least one of the dam, the first color filter pattern or the second color filter pattern.

13. The method of claim 12, wherein a light blocking pattern is formed on at least one of the dam, the first color filter pattern or the second color filter pattern.

14. The method of claim 13, wherein the dam is formed on a signal line and below the light blocking pattern.

15. The method of claim 14, wherein the dam further comprises a white pigment.

16. A thin film transistor substrate, comprising;
    an insulating substrate;
    a signal line located on the insulating substrate;
    a dam and a first color filter pattern located on the insulating substrate;
    a second color filter pattern located on the insulating substrate;
    a smoothing layer located on the dam, the first color filter pattern and the second color filter pattern;
    a pixel electrode located on the smoothing layer; and
    a light blocking pattern located on the signal line,
    wherein the dam and the first color filter pattern are located on the same layer,
    wherein the second color filter pattern comprises a red, a green or a blue color filter pattern, and
    wherein the first color filter pattern comprises a white color filter pattern.

* * * * *